United States Patent
Scott

(10) Patent No.: US 10,174,623 B2
(45) Date of Patent: Jan. 8, 2019

(54) ROTARY BLADE MANUFACTURING METHOD

(71) Applicant: ROLLS-ROYCE plc, London (GB)

(72) Inventor: John M Scott, Derby (GB)

(73) Assignee: ROLLS-ROYCE plc, London (GB)

(*) Notice: Subject to any disclaimer, the term of this patent is extended or adjusted under 35 U.S.C. 154(b) by 382 days.

(21) Appl. No.: 15/138,857

(22) Filed: Apr. 26, 2016

(65) Prior Publication Data

US 2016/0341050 A1 Nov. 24, 2016

(30) Foreign Application Priority Data

May 22, 2015 (GB) .................................. 1508763.8

(51) Int. Cl.
*F01D 5/14* (2006.01)
*F01D 5/20* (2006.01)
(Continued)

(52) U.S. Cl.
CPC ............... *F01D 5/20* (2013.01); *F01D 5/141* (2013.01); *F01D 5/34* (2013.01); *F01D 11/08* (2013.01); *F01D 11/18* (2013.01); *F04D 29/083* (2013.01); *F04D 29/164* (2013.01); *F04D 29/324* (2013.01); *F04D 29/522* (2013.01); *F05D 2220/32* (2013.01); *F05D 2230/50* (2013.01); *F05D 2240/307* (2013.01); *F05D 2250/711* (2013.01); *F05D 2260/941* (2013.01); *Y02T 50/672* (2013.01); *Y02T 50/673* (2013.01)

(58) Field of Classification Search
CPC . F01D 5/20; F01D 11/08; F01D 11/18; F04D 29/164; F04D 29/324; F05D 2240/307; F05D 2260/941
See application file for complete search history.

(56) References Cited

U.S. PATENT DOCUMENTS

| | | | | |
|---|---|---|---|---|
| 5,513,952 A | * | 5/1996 | Mizuta | .................... F01D 5/143 415/182.1 |
| 8,511,991 B2 | * | 8/2013 | Hunt | ....................... B23P 15/04 29/889.72 |

(Continued)

FOREIGN PATENT DOCUMENTS

| | | |
|---|---|---|
| CA | 2 791 040 A1 | 4/2013 |
| CH | 699 984 A1 | 5/2010 |

(Continued)

OTHER PUBLICATIONS

Nov. 20, 2015 Search Report issued in British Patent Application No. 1508763.8.

(Continued)

*Primary Examiner* — Ninh H. Nguyen
(74) *Attorney, Agent, or Firm* — Oliff PLC

(57) ABSTRACT

The present invention provides a method of designing a manufacturing geometry for a tip portion of a rotary blade for a gas turbine engine. The method comprises first devising a theoretical hot running geometry of the tip portion at a specified design condition. Next, the theoretical operational forces acting on the theoretical hot running geometry at the specified design condition are calculated e.g. using CFD software. Then, the manufacturing geometry is determined (e.g. using FEA analysis) using the calculated theoretical operational forces.

15 Claims, 2 Drawing Sheets

(51) Int. Cl.
*F01D 11/08* (2006.01)
*F04D 29/32* (2006.01)
*F01D 5/34* (2006.01)
*F01D 11/18* (2006.01)
*F04D 29/08* (2006.01)
*F04D 29/52* (2006.01)
*F04D 29/16* (2006.01)

(56) References Cited

U.S. PATENT DOCUMENTS

| | | | | |
|---|---|---|---|---|
| 8,647,054 B2 * | 2/2014 | Aulich | ................... | F01D 5/143 |
| | | | | 415/119 |
| 2011/0188999 A1 * | 8/2011 | Braun | ..................... | F01D 5/141 |
| | | | | 415/170.1 |
| 2012/0100000 A1 * | 4/2012 | He | ............................ | F01D 5/20 |
| | | | | 416/223 R |

FOREIGN PATENT DOCUMENTS

| | | |
|---|---|---|
| CN | 103422912 A | 12/2013 |
| EP | 2 199 543 A2 | 6/2010 |

OTHER PUBLICATIONS

Sep. 30, 2016 Search Report issued in European Patent Application No. 16 16 6883.

* cited by examiner

ROTARY BLADE MANUFACTURING METHOD

CROSS-REFERENCE TO RELATED APPLICATIONS

This application is based upon and claims the benefit of priority from British Patent Application Number 1508763.8 filed 22 May 2015, the entire contents of which are incorporated by reference.

BACKGROUND

1. Field of the Disclosure

The present disclosure relates to a rotary blade and a method of designing and manufacturing a rotary blade, such as a rotary blade for use in a gas turbine engine.

2. Description of the Related Art

It is desirable to reduce the clearance between the tip portion of a rotary blade and the casing of a gas turbine engine in order to maximise fuel efficiency.

However, reducing the build clearance between the tip portion and the casing can lead to undesirable rubbing of the tip portion on the casing during engine running which can induce excessive stresses in the rotary blade. In addition to radial growth due to centrifugal force, such rubbing occurs, in part, because the tip portion twists during running of a gas turbine engine due to loads generated by the gas flow and rotary motion.

Blade tip portions are typically formed to be concentric with the casing e.g. by grinding or EDM wire-cutting the tip portions whilst rotating a drum or disc (on which the rotary blades are mounted) and the attached rotary blades at low speed. This gives good circularity about the rotational axis i.e. the tip portions are axisymmetric about the engine axis.

Casings e.g. compressor casings, have a radially inner surface (facing the blade tip portions) which is typically cylindrical or conical.

Tip portions that are axisymmetric about the engine axis (i.e. concentric with a cylindrical casing) in their cold/static position, may rub the casing at both their leading and trailing edges as the clearance between the leading and trailing edges and the casing will reduce as a result of blade twist during running of the turbine engine (assuming that the axis of twist is between the leading and trailing edges). This is shown in FIGS. 2a and 2b by way of example.

Blade tips that are concentric with a converging conical casing in their cold/static position may rub the casing at the leading edge as the clearance between the leading edge and the case will reduce as a result of blade twist during running of the turbine engine (assuming that the axis of twist is between the leading and trailing edges). Conversely, the clearance between the trailing edge and the casing will increase as a result of the blade twist resulting in reduced aerodynamic efficiency. For example, a large aerofoil in a gas turbine compressor develops a blade tip twist of around 3° during engine running resulting in the clearance between the leading edge and the casing decreasing by around 0.4 mm and the clearance between the trailing edge and the casing increasing by around 0.7 mm.

The rubbing can cause blade damage both at the tip portion (resulting from the direct contact with the casing) and throughout the rotary blade (resulting from stresses arising from vibrations and thermal damage arising from frictional heat caused by the rubbing). This rubbing can cause significant reduction in fatigue life on a blisk (a rotary disc with integrally-joined rotary blades) since the rotary blades will bend at the interface with the disc—this area is typically highly stressed during engine running. Furthermore abraded material can block cooling holes in the downstream turbine aerofoils.

In order to avoid the heavy rubbing during running conditions, the build clearance between the blade tip portions in their cold/static state and the casing is typically increased. This reduces the turbine efficiency especially in the early stages of engine running.

It is known to provide a track liner on the interior surface of the compressor casing to provide a shroud for the tip portions. The track liner may be formed of an abradable material (e.g. an epoxy resin) which is abraded by the blade tip portions to form channels in the track liner into which the tip portions extend. These abradable track liners have found some success with metallic rotary blades (e.g. titanium and nickel rotary blades) which are very durable but a disadvantage of these track liners is that the running clearance is set by the longest rotary blade. These track liners are not appropriate for use with rotary blades formed of composite material (e.g. fibre-reinforced plastic material) which are less durable and readily suffer damage to the tip portions.

Ablative casings are also known where the tip portions of the blades are formed of an abradable material and are abraded by the casing during rubbing. Again, damage to the rotary blade can occur as a result of vibrational and thermal energy arising during rubbing.

OBJECTS AND SUMMARY

There is a need for a rotary blade having a tip portion which allows a clearance between the blade tip portion and the casing in cold/static engine conditions but which minimises or eliminates rubbing between the blade tip portion and casing as the blade twists and grows radially outwards during engine running conditions.

In a first aspect, there is provided a method of designing a manufacturing geometry for a tip portion of a rotary blade for a gas turbine engine, said method comprising:
  devising a theoretical hot running geometry of the tip portion at a specified design condition;
  calculating the theoretical operational forces acting on the theoretical hot running geometry at the specified design condition; and
  determining the manufacturing geometry using the calculated theoretical operational forces.

The present inventors have found that calculating the theoretical operational forces acting on a theoretical hot running geometry of a blade tip portion and then using these calculated forces to reverse engineer a manufacturing geometry (i.e. a geometry in the cold/static condition when the operation forces are not acting) provides a manufacturing geometry for the tip portion that accommodates growth and twist during hot running of the gas turbine engine (and thus avoids rubbing of the rotary blade on the engine casing) but which maximises engine efficiency during early stages of engine running.

In some embodiments, the theoretical hot running geometry of the tip portion at the specified design condition is devised by:
  selecting dimensions for a casing within which the rotary blade is intended to run; and
  devising the theoretical hot running geometry of the tip portion such that a tip portion having said geometry would form a seal with the casing (i.e. abut the casing at all points during rotation) at the specified design condition.

In some embodiments, the theoretical operational forces are calculated using computational fluid dynamics (CFD) software. The theoretical operation forces may include the rotational loading acting on the theoretical hot running geometry at the specified design condition. The CFD software will calculate and output aerodynamic forces acting on the theoretical hot running geometry at the specified design condition.

In some embodiments, the theoretical hot running geometry may be optimised by reducing/minimising the theoretical operational forces on the rotary blade to meet the aerodynamic performance criteria at said design condition.

In some embodiments, the manufacturing geometry is determined using mechanical finite element analysis (FEA) (e.g. aero-elastic FEA) software. The FEA software will use the theoretical operational forces calculated for the theoretical hot running geometry to reverse engineer back to a theoretical cold/static geometry which is the geometry of the blade tip portion when the theoretical operational forces are not acting. This theoretical cold/static geometry is then used as the manufacturing geometry The step of determining the manufacturing geometry (e.g. using FEA software) may involve determining an adjusted tip angle (twist) and/or a radial extension reduction which can be applied to the theoretical hot running geometry to derive the theoretical cold/static geometry (i.e. the manufacturing geometry).

In some embodiments, computer-aided design (CAD) software may be used to derive the cold/static geometry (manufacturing geometry) using the adjusted tip angle and radial extension derived using the step of determining the manufacturing geometry.

The specified design condition may be selected as an engine running condition at which the radial growth and twist of the rotary blade is maximum.

In some embodiments, the specified design condition may be maximum engine power (e.g. at aircraft take off conditions). This design condition may be especially useful in embodiments where the rotary blade is integral with a rotor disc (i.e. in embodiments relating to the design of a blisk).

In some embodiments, the specified design condition may be at aircraft cruise conditions. This design condition may be especially useful in embodiments where the rotary blade has a dove-tailed root portion which is received in a groove on a rotor disc.

In a second aspect, there is provided a method of manufacturing a rotary blade for a gas turbine engine, said rotary blade having a tip portion, said method comprising:
    designing a manufacturing geometry for the tip portion using a method according to the first aspect, and
    forming a tip portion having said manufacturing geometry.

In some embodiments, the method comprises forming a tip portion having said manufacturing geometry by machining e.g. milling the tip portion onto the rotary blade.

In a third aspect, there is provided a rotary blade for a gas turbine engine, said rotary blade having a tip portion and being manufactured according to the second aspect.

In some embodiments, the tip portion has a convex profile along its camber line (extending from the leading edge to the trailing edge).

In some embodiments, the tip portion is integrally formed with the remainder (e.g. with a body portion) of the rotary blade.

The tip portion (and body portion) may be formed of metal e.g. titanium or of a composite material e.g. fibre-reinforced plastic material such as carbon-fibre reinforced epoxy resin.

In a fourth aspect, there is provided a blisk having a plurality of rotary blades according to the third aspect.

In a fifth aspect, there is provided a rotor stage for a gas turbine engine, wherein the rotor stage comprises a plurality of axially-aligned rotary blades within a casing, each rotary blade having a tip portion with a camber line extending between a leading edge and a trailing edge, wherein a gap between said casing and tip portion for at least one of said plurality of rotary blade blades is constant along the camber line at a specified design condition and varies along the camber line at a cold/static condition such that, in the cold/static condition, the tip portion is closer to the casing mid-camber line than at the leading or trailing edges.

It has been found that providing a tip portion that is closer to the casing mid-camber line than at the leading or trailing edges when in a cold/static condition (which will be the condition in which the tip portion is manufactured) results in a tip portion profile that is equidistant from the casing along the camber line when the rotary blade is subjected to twisting during hot running conditions. This leads to concentricity between the tip portions and casing during hot running conditions helps minimise rubbing between the tip portion and casing during running without having to increase clearance between the tip portion and casing in cold/static engine conditions. Accordingly, this helps avoid damage to the rotary blade without compromising engine efficiency even at early stages of engine running.

In some embodiments, the/each tip portion has a convex profile (along the camber line) in the cold/static condition.

In some embodiments, each tip portion is integrally formed with the remainder (e.g. with a body portion) of the respective rotary blade.

The tip portion (and body portion) may be formed of metal e.g. titanium or of a composite material e.g. fibre-reinforced plastic material such as carbon-fibre reinforced epoxy resin.

The specified design condition may be selected as an engine running condition at which the radial growth and twist of the rotary blade is maximum.

In some embodiments, the specified design condition may be maximum engine power (e.g. at aircraft take off conditions). This design condition may be especially useful in embodiments where the rotary blade is integral with a rotor disc (i.e. in embodiments relating to the design of a blisk).

In some embodiments, the specified design condition may be at aircraft cruise conditions. This design condition may be especially useful in embodiments where the rotary blade has a dove-tailed root portion which is received is a circumferential groove on a rotor disc.

In a sixth aspect, there is provided a compressor or turbine having a plurality of rotary blades according to the third aspect, a blisk according to the fourth aspect or a rotor stage according to the fifth aspect.

In a seventh aspect, there is provided a gas turbine engine having a compressor or turbine according to the sixth aspect.

BRIEF DESCRIPTION OF THE DRAWINGS

Embodiments will now be described by way of example with reference to the accompanying drawings in which.

DETAILED DESCRIPTION OF EMBODIMENTS

Figure 1:
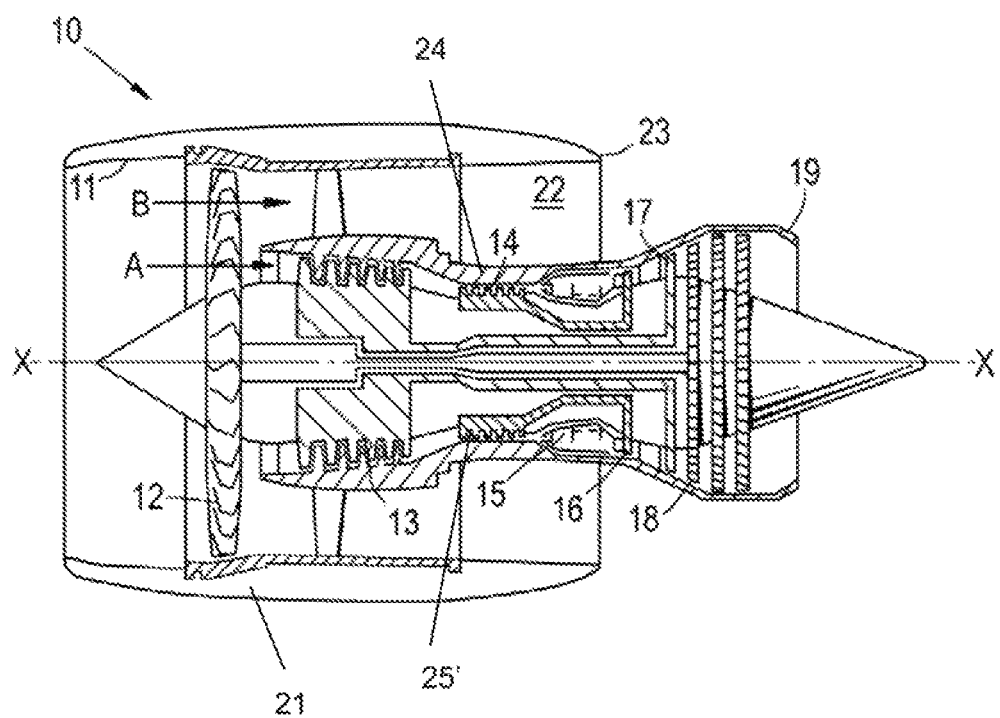
FIG. 1 shows a cross-section through a ducted fan gas turbine engine.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The high pressure compressors 14 comprises a plurality of rotary blades 25' (formed of a fibre-reinforced plastic material such as carbon-fibre/epoxy resin composite) which are surrounded by a compressor casing 24 having a cylindrical radially inner surface.

Figures 2A, 2B:
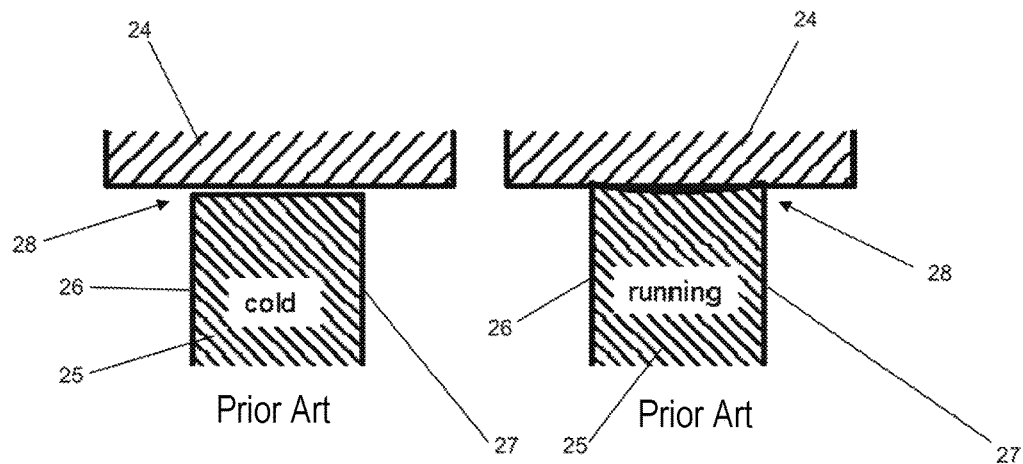
FIG. 2a shows a cross-section through a prior art rotary blade in a cold/static engine condition.
FIG. 2b shows a cross-section through the prior art rotary blade in a running condition.

FIGS. 2a and 2b show a typical rotary blade 25 and casing 24.

The prior art rotary blade has a leading edge 26 and a trailing edge 27 with a tip section 28 extending between the two edges along a camber line. The blade is formed such that, under cold/static engine conditions, it is axisymmetric about the engine axis and concentric with the casing 24 as shown in FIG. 2a. During running conditions, blade twist occurs and the leading edge 26 and trailing edge 27 move closer to the casing 24 such that the tip section 28 is no longer concentric with the casing 24 as shown in FIG. 2b. This causes undesirable rubbing between the casing 24 and the leading and trailing edges 26, 27 of the tip section 28 of the rotary blade 25.

Figures 3A, 3B:
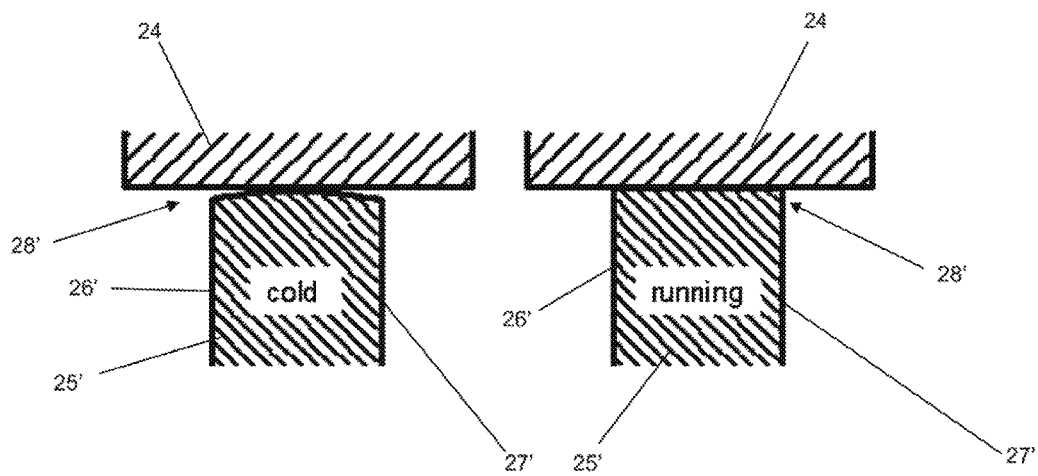
FIG. 3a shows a cross-section through a rotary blade according to a first embodiment in a cold/static engine condition.
FIG. 3b shows a cross-section through the first embodiment in a hot running condition.

FIGS. 3a and 3b show a rotary blade 25' and cylindrical casing 24 according to a first embodiment of the present disclosure.

The rotary blade has a leading edge 26' and a trailing edge 27' with a tip section 28' extending between the two edges along a camber line.

The tip section 28' has a convex profile along the camber line between the leading edge 26' and the trailing edge 27' when in a cold/static engine condition as shown in FIG. 3a i.e. the tip section 28' is closer to the casing 24 at the midpoint of the camber line than at the leading and trailing edges. The tip portion is non-axisymmetric with the engine axis in this condition. This minimises the clearance between the tip section 28' and the casing 24 under cold/static engine conditions. Blade twist occurring during hot running conditions distorts the profile of the tip section 28' along the camber line such that the tip section 28' becomes concentric with the cylindrical casing 24 as shown in FIG. 3b (i.e. the gap between the casing and tip portion is equal along the camber line) so that undesirable rubbing is minimised. The tip portion is axisymmetric with the engine axis in this condition.

The radial extension and angle of the tip portion 28' in the cold/static condition (shown in FIG. 3a) is determined as follows.

Firstly, a theoretical hot running geometry of the tip portion (which is axisymmetric about the engine axis) at a specified design condition is devised. The specified design condition is selected as maximum engine power (e.g. at aircraft take off conditions).

The theoretical hot running geometry is devised by:
  selecting dimensions for the casing 24; and
  devising the theoretical hot running geometry of the tip portion such that a tip portion having said geometry would form a seal with the casing (i.e. abut the casing at all points during rotation) at maximum engine power.

Next, the theoretical operational (aerodynamic/rotational) forces acting on the theoretical hot running geometry at the specified design condition are calculated using CFD software. Such CFD software may be conventional.

The output from the CFD software is then used to reverse engineer back to a tip portion geometry in the absence of the theoretical operational forces. This is carried out using mechanical finite element analysis (FEA) (e.g. aero-elastic FEA) software to calculate a cold/static geometry of the tip portion (which is non-axisymmetric about the engine axis). The FEA software is typically used to calculate an adjusted tip angle (twist) and the radial extension reduction for the tip portion. Such FEA software may be well known.

CAD software is then used to devise a manufacturing geometry by applying the tip angle adjustment and radial reduction calculated from FEA to the theoretical hot running geometry to derive the cold/static condition (manufacturing) geometry.

The rotary blade 25' is then machined (e.g. milled) to form the tip portion 28' having the manufacturing geometry.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

I claim:

1. A method of designing a manufacturing geometry for a tip portion of a rotary blade for a gas turbine engine, said method comprising:
  devising a theoretical hot running geometry of the tip portion at a specified design condition;
  calculating the theoretical operational forces acting on the theoretical hot running geometry at the specified design condition; and determining the manufacturing geometry using the calculated theoretical operational forces.

2. A method according to claim 1 wherein the theoretical hot running geometry of the tip portion at the specified design condition is devised by:
- selecting dimensions for a casing within which the rotary blade is intended to run; and
- devising the theoretical hot running geometry of the tip portion such that a tip portion having said geometry would form a seal with the casing at the specified design condition.

3. A method according to claim 1 wherein the theoretical operational forces are calculated using computational fluid dynamics (CFD) software.

4. A method according to claim 1 wherein the theoretical hot running geometry is optimised by reducing/minimising the theoretical operational forces on the rotary blade to meet the aerodynamic performance criteria at said design condition.

5. A method according to claim 1 wherein the manufacturing geometry is determined using mechanical finite element analysis (FEA) software.

6. A method according to claim 1 wherein the step of determining the manufacturing geometry involves determining an adjusted tip angle and/or a radial extension reduction which is applied to the theoretical hot running geometry to derive the manufacturing geometry.

7. A method according to claim 1 wherein the specified design condition is selected as an engine running condition at which the radial growth and twist of the rotary blade is maximum.

8. A method according to claim 7 wherein the specified design condition is maximum engine power.

9. A method according to claim 7 wherein the specified design condition is aircraft cruise conditions.

10. A method of manufacturing a rotary blade for a gas turbine engine, said rotary blade having a tip portion, said method comprising:
- designing a manufacturing geometry for the tip portion using a method according to claim 1, and
- forming a tip portion having said manufacturing geometry.

11. A method according to claim 10 comprising forming the tip portion having said manufacturing geometry by machining/milling the tip portion onto the rotary blade.

12. A rotor stage for a gas turbine engine, wherein the rotor stage comprises a plurality of axially-aligned rotary blades within a casing, each rotary blade having a tip portion with a camber line extending between a leading edge and a trailing edge, wherein the spacing between said casing and tip portion for at least one of said plurality of rotary blades is constant along the camber line at a specified design condition and varies along the camber line at a cold/static condition such that, in the cold/static condition, the tip portion is closer to the casing at mid-camber line than at the leading or trailing edges.

13. A rotor stage according to claim 12 wherein the/each tip portion has a convex profile along the camber line in the cold/static condition.

14. A compressor or turbine having a rotor stage according to claim 12.

15. A gas turbine engine having a compressor or turbine according to claim 14.

* * * * *